US012623203B2

(12) United States Patent
Trivelpiece et al.

(10) Patent No.: US 12,623,203 B2
(45) Date of Patent: May 12, 2026

(54) FUNCTIONALIZED POROUS MATERIAL AND RELATED METHODS

(71) Applicant: BATTELLE SAVANNAH RIVER ALLIANCE, LLC, Aiken, SC (US)

(72) Inventors: Cory L. Trivelpiece, Aiken, SC (US); Madison C. Hsieh, II, Aiken, SC (US); Austin Stanfield, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 563 days.

(21) Appl. No.: 18/082,006

(22) Filed: Dec. 15, 2022

(65) Prior Publication Data

US 2024/0198315 A1 Jun. 20, 2024

(51) Int. Cl.

| | |
|---|---|
| ***B01J 20/00*** | (2006.01) |
| ***B01D 39/20*** | (2006.01) |
| ***B01J 20/08*** | (2006.01) |
| ***B01J 20/28*** | (2006.01) |
| ***B01J 20/32*** | (2006.01) |
| ***B01J 47/00*** | (2017.01) |

(52) U.S. Cl.

CPC .... *B01J 20/28042* (2013.01); *B01D 39/2003* (2013.01); *B01D 39/2027* (2013.01); *B01D 39/2068* (2013.01); *B01J 20/08* (2013.01); *B01J 20/3204* (2013.01); *B01J 20/3221* (2013.01); *B01J 20/3236* (2013.01); *B01J 20/3242* (2013.01); *B01J 47/00* (2013.01); *B01D 2239/0414* (2013.01)

(58) Field of Classification Search

None

See application file for complete search history.

(56) References Cited

U.S. PATENT DOCUMENTS

| | | | | |
|---|---|---|---|---|
| 5,397,755 | A | 3/1995 | Parker et al. | |
| 5,954,893 | A * | 9/1999 | Baldwin | C25D 11/24 148/272 |
| 2004/0219116 | A1 * | 11/2004 | Reynders | C09D 11/50 424/63 |
| 2018/0251396 | A1 | 9/2018 | Weinberger | |
| 2019/0211215 | A1 * | 7/2019 | Ijeri | C23F 11/06 |
| 2022/0081349 | A1 | 3/2022 | Hust et al. | |
| 2022/0089476 | A1 | 3/2022 | Hust et al. | |
| 2022/0089484 | A1 | 3/2022 | Jackson et al. | |

FOREIGN PATENT DOCUMENTS

| | | | |
|---|---|---|---|
| CN | 1994921 | A | 7/2007 |
| CN | 1994922 | A | 7/2007 |
| CN | 101462790 | A | 6/2009 |

(Continued)

OTHER PUBLICATIONS

KR-20220018108-A, English translation, Feb. 2022 (Year: 2022).*

(Continued)

*Primary Examiner* — Stefanie J Cohen

(74) *Attorney, Agent, or Firm* — Dority & Manning, P.A.

(57) ABSTRACT

In one aspect, a functionalized porous material includes a synthetic porous material, the synthetic porous material comprising a surface, wherein at least a portion of the synthetic porous material surface is a substrate; and a mixed-metal hydroxide, wherein the mixed-metal hydroxide is affixed to the substrate.

17 Claims, 1 Drawing Sheet

100

102

(56) References Cited

FOREIGN PATENT DOCUMENTS

| | | | | | |
|---|---|---|---|---|---|
| CN | 202529912 U | | 11/2012 | | |
| CN | 203754504 U | | 8/2014 | | |
| CN | 105541089 A | | 5/2016 | | |
| CN | 107837786 A | | 3/2018 | | |
| CN | 212293210 U | | 1/2021 | | |
| DE | 10163977 A1 | | 7/2003 | | |
| JP | 2002011497 A | | 1/2002 | | |
| KR | 20220018108 A | * | 2/2022 | ............ | H01M 12/08 |
| WO | WO 2017/069545 A1 | | 4/2017 | | |

OTHER PUBLICATIONS

Beiranvand et al., "Nitrate Removal Using Pumice Aggregate Coated with Zeolite Nanoparticles Modified by Cationic Surfactant from Synthetic Aqueous Solutions", Department of Irrigation and Drainage, Shahid Chamran University of Ahvaz, Ahvaz, Iran, May 11, 2019, 11 pages.

Beiranvand et al., "Stabilization of Bentonite Nanoparticles Modified by Cationic Surfactant on Pumice Aggregates for the Removal of Nitrate from Aqueous Solution", Journal of Water and Wastewater, vol. 31, No. 2, May 20, 2019, 15 pages.

Bekaroglu et al., "Hybrid Adsorptive and Oxidative Removal of Natural Organic Matter Using Iron Oxide-Coated Pumice Particles", Research Article, Journal of Chemistry, 2016, 9 pages.

Boesman et al., "Growth, structure and oxygen penetration in particle supported autotrophic biofilms", Water Science Technology, 49 (11-12), 2004, pp. 371-377.

Bornemann et al., "Natural microbial populations in a water-based biowaste management system for space life support", Life Sciences in Space Research, vol. 7. 2015, pp. 39-52.

Derakhshan et al., "Evaluation of volcanic pumice stone as media in fixed bed sequence batch reactor for atrazine removal from aquatic environments", 74 (11), 2016, pp. 2569-2581.

Elser et al., "Community Structure and Biogeochemical Impacts of Microbial Life on Floating Pumice", Applied and Environmental Microbiology, vol. 81, No. 5, Mar. 2015, 8 pages.

Modenutti et al., "Effects of Volcanic Pumice Inputs on Microbial Community Composition and Dissolved C/P Ratios in Lake Waters: an Experimental Approach", Microbiology of Aquatic Systems, Jan. 2016, 12 pages.

Nasseri et al., "Evaluation and comparison of aluminum-coated pumice and zeolite in arsenic removal from water resources", Iranian Journal of Environmental Health Science & Engineering, vol. 9, 2012, 7 pages.

Ryhiner et al., "The Use of Submerged Structured Packings in Biofilm Reactors for Wastewater Treatment", Water Science Technology, 26 (3-4), 1992, pp. 723-731.

Salifu et al., "Aluminum (hydr)oxide coated pumice for fluoride removal from drinking water: Synthesis, equilibrium, kinetics and mechanism", Chemical Engineering Journal 228, 2013, 12 pages.

Sepehr et al., "Surface modification of pumice enhancing its fluoride adsorption capacity: An insight into kinetic and thermodynamic studies", Chemical Engineering Journal 228, 2013, 13 pages.

Zampieri et al., "Zeolite Coatings on Microcellular Ceramic Foams: A Novel Rout to Microreactor and Microseparator Devices", Advanced Materials, vol. 16, 2004, 5 pages.

* cited by examiner

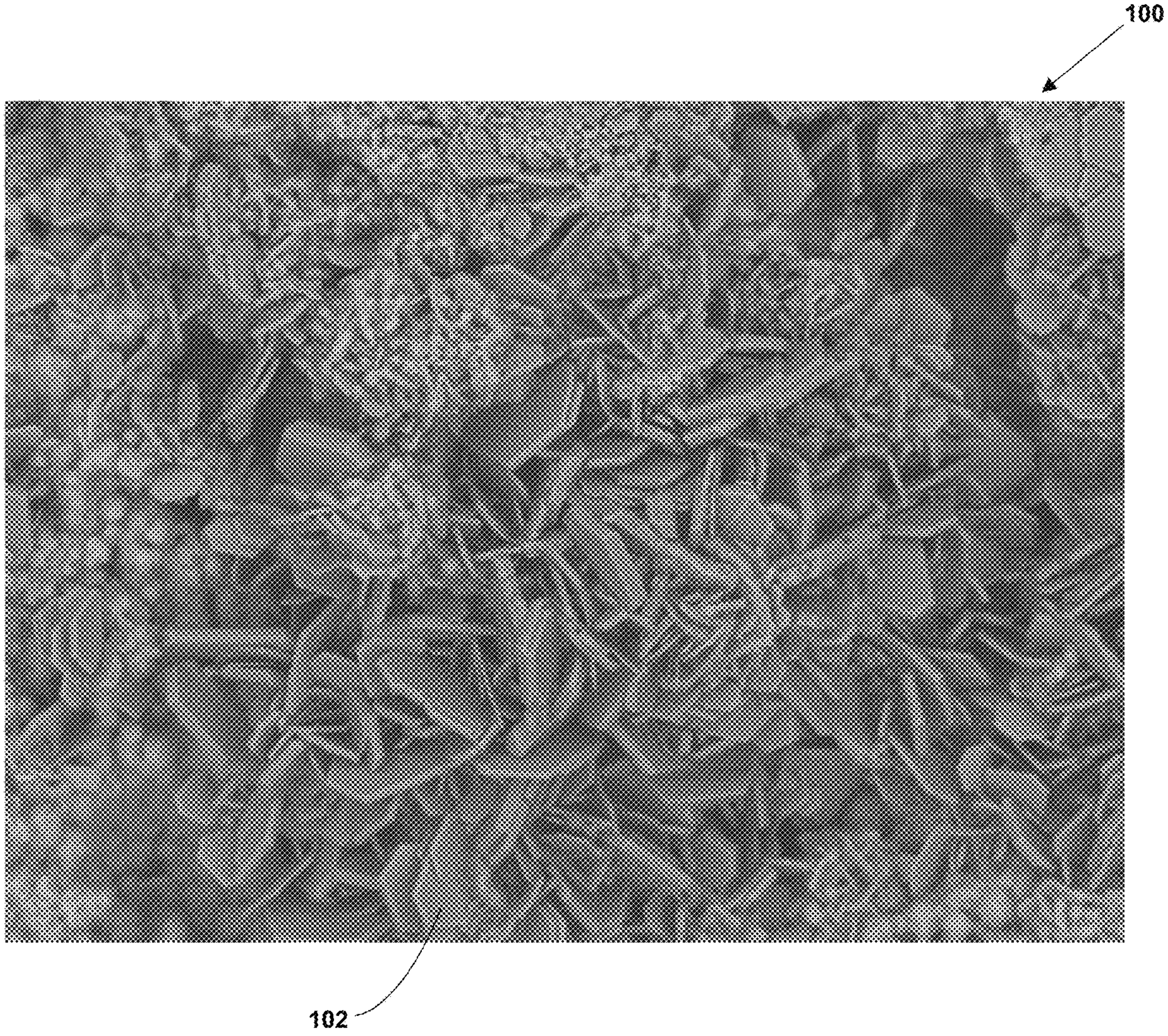
100
102

FUNCTIONALIZED POROUS MATERIAL AND RELATED METHODS

FEDERAL RESEARCH STATEMENT

This invention was made with government support under Contract No. 89303321CEM000080 awarded by the U.S. Department of Energy. The government has certain rights in the invention.

FIELD

This present subject matter relates generally to a functionalized porous material, more particularly, to a porous material functionalized with a synthetic mineral.

BACKGROUND

In recent years, corporate sustainability initiatives and national environmental initiatives have become increasingly prominent and influential. Notably, the waste management of manufacturing processes has become a growing concern as manufacturers adjust their processes to better respond to environmental concerns of the manufacturer itself, the public, and administrative or governmental entities. Particularly, the waste management of glass has become a growing concern in modern times. Indeed, it is estimated that over four million tons of waste glass are disposed of in landfills in the United States each year. As such, various corporate sustainability initiatives have focused on processes involving waste glass material. However, recycling waste glass into practical and serviceable products has proven to be challenging.

Various different types of materials are utilized in filtration processes. Indeed, filtration devices including activated carbon, activated alumina, polymers, minerals, and/or metals have traditionally been used to filter process streams having contaminants and/or undesirable components. Generally, the type of filtration materials used depends on the targeted contaminants or undesirable components of the respective process streams. Generally, porous materials have been utilized to filter or treat process streams having contaminants and/or undesirable components. However, many porous materials, particularly functionalized porous materials, are often cost-intensive, have limited efficacy, and/or have poor performance.

Thus, there is a need for an improved functionalized porous material, particularly a functionalized porous material formed from recycled materials, and related methods.

SUMMARY OF THE INVENTION

Aspects and advantages of the invention will be set forth in part in the following description, or may be obvious from the description, or may be learned through practice of the invention.

In one aspect, the present subject matter is directed to a functionalized porous material. The functionalized porous material may include: a synthetic porous material, the synthetic porous material comprising a surface, wherein at least a portion of the synthetic porous material surface is a substrate; and a mixed-metal hydroxide, wherein the mixed-metal hydroxide is affixed to the substrate.

In one aspect, the present subject matter is directed to a method for forming a functionalized porous material. The method may include: positioning a synthetic porous material within a reaction vessel, the synthetic porous material comprising a surface, wherein at least a portion of the synthetic porous material surface is a substrate; adding the reaction solution to the reaction vessel, wherein the reaction solution contacts the synthetic porous material, the reaction solution comprising a salt solution and a base composition, the salt solution comprising a salt and water, the salt solution having a concentration of from about 0.01 M to about 5 M of the salt, the base composition comprising a hydroxide, wherein the synthetic porous material is functionalized to form a functionalized porous material, wherein a functional group of the functionalized porous material is a mixed-metal hydroxide.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an image of one embodiment of a functionalized engineered cellular magmatic in accordance with aspects of the present subject matter.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to a functionalized porous material and related methods The functionalized porous material may comprise a synthetic mineral (e.g., a mixed-metal hydroxide). In this respect, the synthetic mineral may be a functional group of the functionalized porous material. The functionalized porous material of the present disclosure may have enhanced filtration performance when compared to traditional filtration materials. For instance, the functionalized porous material may have enhanced efficacy in ion exchange, chemisorption, and physisorption filtration processes, such as the removal of contaminants (e.g., anions) from aqueous process streams. Further, the functionalized porous material may be utilized in chemical or biological remediation of aqueous process streams (e.g., wastewater, agricultural runoff, or industrial processes and byproducts).

It should be understood that throughout the entirety of this specification, each numerical value (e.g., weight percentage, concentration) disclosed should be read as modified by the term "about" (unless already expressly so modified) and then read again as not to be so modified. For instance, a value of "100" is to be understood as disclosing "100" and "about 100". Further, it should be understood that throughout the entirety of this specification, when a numerical range (e.g., weight percentage, concentration) is described, any and every amount of the range, including the endpoints and all amounts therebetween, is disclosed. For instance, a range of "1 to 100", is to be understood as disclosing both a range of "1 to 100 including all amounts therebetween" and a range of "about 1 to about 100 including all amounts therebetween". The amounts therebetween may be separated by any incremental value.

In one aspect, the functionalized porous material may include a synthetic porous material. In this respect, the synthetic porous material may include a foam glass, an engineered cellular magmatic, or a combination thereof. Notably, engineered cellular magmatics are distinguishable from foam glass in that engineered cellular magmatics comprise crystalline components and vitreous components. Further, foam glass is traditionally produced to be inert, whereas engineered cellular magmatics are formed to be reactive.

As previously disclosed, the synthetic porous material may include an engineered cellular magmatic. Generally, engineered cellular magmatics are synthetic materials formed of glass or ceramic, such as recycled glass or recycled ceramic. For instance, in one aspect, an engineered cellular magmatic may comprise silica glass.

Generally, the synthetic porous material may comprise a glass composition (e.g, recycled glass, virgin glass). The glass composition may include granulated glass, such as pulverized glass. In this respect, the glass composition may have a selectively chosen average particle size. For instance, the glass composition may have an average particle size of 3000 microns or less, such as 2500 microns or less, such as 2200 microns or less, such as 2000 microns or less, such as 1800 microns or less, such as 1500 microns or less, such as 1200 microns or less, such as 1000 microns or less, such as 800 microns or less, such as 500 microns or less, such as 400 microns or less, such as 300 microns or less, such as 200 microns or less, such as 150 microns or less, such as 100 microns or less, such as 75 microns or less, such as 50 microns or less, such as 40 microns or less, such as 25 microns or less, such as 15 microns or less, such as 10 microns or less, such as 5 microns or less, such as 1 micron or less, such as 900 nanometers or less, such as 800 nanometers or less, such as 600 nanometers or less, such as 500 nanometers or less, such as 300 nanometers or less, such as 200 nanometers or less, such as 100 nanometers or less, such as 50 nanometers or less, such as 25 nanometers or less, such as 10 nanometers or less. The glass composition may have an average particle size of 5 nanometers or more, such as 10 nanometers or more, such as 20 nanometers or more, such as 30 nanometers or more, such as 40 nanometers or more, such as 50 nanometers or more, such as 100 nanometers or more, such as 250 nanometers or more, such as 500 nanometers or more, such as 750 nanometers or more, such as 1 micron or more, such as 5 microns or more, such as 10 microns or more, such as 20 microns or more, such as 50 microns or more, such as 100 microns or more, such as 200 microns or more, such as 300 microns or more, such as 400 microns or more, such as 500 microns or more, such as 800 microns or more, such as 1000 microns or more, such as 1200 microns or more, such as 1500 microns or more, such as 1800 microns or more, such as 2000 microns or more, such as 2200 microns or more, such as 2500 microns or more. Furthermore, in one aspect, the aforementioned values may refer to a median particle size of the glass composition.

In general, the glass composition may include any suitable glass. For instance, the glass composition may include silica glass, soda-lime glass, composite glass, glass wool, container glass, lead glass, borosilicate glass, aluminosilicate glass, germanium-oxide glass, glass-ceramic, fused silica glass, ninety-six percent silica glass, or a combination thereof.

In one aspect, the synthetic porous material may comprise a foaming agent (e.g., blowing agent). The foaming agent may include physical foaming agents, chemical foaming agents (e.g., carbonaceous materials), or a combination thereof. For instance, in one aspect, the foaming agent may comprise anthracite, aluminum nitride, aluminum slag, activated carbon, activated charcoal, carbon ash, carbon black, calcium carbonate, calcium sulfate, coke, dolomite, fly ash, glycerin, graphite, limestone, magnesium carbonate, manganese oxide, silicon carbide, sodium carbonate, sodium silicate, soot, or a combination thereof.

In one aspect, the synthetic porous material may comprise a glass composition and a foaming agent. In this respect, the process of forming the synthetic porous material may include mixing the glass composition and the foaming agent. Then, the resulting mixture of the glass composition and the foaming agent may be heated until the mixture foams into a synthetic porous material. For instance, the resulting mixture of the glass composition and the foaming agent may be heated in a kiln or an oven at a temperature from about 300° C. to about 1400° C., such as about 300° C. or more, such as about 400° C. or more, such as about 500° C. or more, such as about 600° C. or more, such as about 700° C. or more, such as about 800° C. or more, such as about 900° C. or more, such as about 1000° C. or more, such as about 1100° C. or more, such as about 1200° C. or more, such as about 1300° C. or more, such as about 1400° C. or less, such as about 1300° C. or less, such as about 1200° C. or less, such as about 1100° C. or less, such as about 1000° C. or less, such as about 900° C. or less, such as about 800° C. or less, such as about 700° C. or less, such as about 600° C. or less, such as about 500° C. or less, such as about 400° C. or less. The heating of the mixture of the glass composition and the foaming agent may result in the foaming agent releasing a gas. The release of the gas from the foaming agent may produce a foamed synthetic material. Then, the foamed synthetic material may be cooled to form a synthetic porous material. Notably, when an engineered cellular magmatic is produced from a glass composition and a foaming agent, and any other optional additives, the engineered cellular magmatic may be produced at temperatures where the viscosity of the glass composition is from about 1.5 to about 4 orders of magnitude greater than the viscosity of the glass composition at the glass composition's liquidus temperature.

In one aspect, the synthetic porous material may comprise a reaction agent. The reaction agent may be located on the surface of the synthetic porous material, which may be referred to herein as the synthetic porous material surface. In this respect, the reaction agent may be present over a portion or the entirety of the surface of the synthetic porous material. In one aspect, the contact of a solution to the synthetic porous material may result in the dissolution of at least a portion of one or more components of the synthetic porous material. As used herein, a solution that contacts the synthetic porous material may be referred to as the reaction solution. It should be understood that the synthetic porous material may be positioned within a reaction vessel before the reaction solution contacts the synthetic porous material. In one aspect, the contact of the reaction solution to the synthetic porous material may result in the dissolution of at least a portion of the reaction agent from the synthetic porous material. In this respect, the synthetic porous material may provide a dissolution source for a reaction agent, such as a divalent metal cation and/or a trivalent metal cation. The dissolution of the reaction agent into the reaction solution may result in the growth or formation of chemical compounds (e.g., minerals, synthetic minerals, sols, gels, clayey materials) on the surface of the synthetic porous material. In this respect, the dissolution of the reaction agent into the reaction solution may result in the reaction of the reaction agent with the reaction solution to form a chemical compound, such as a mineral, a synthetic mineral, a sol, a gel, a clayey material, or a combination thereof, that is affixed to the synthetic porous material.

In general, the surface of the synthetic porous material may be a substrate for the growth of chemical compounds or the formation of chemical compounds on the surface of the synthetic porous material. The areas of chemical compound growth on the surface of the synthetic porous material may be referred to as the substrate. The substrate of the synthetic porous material may cover from about 5% to about 100% of the surface of the synthetic porous material. For instance, the substrate may be present on about 5% or more, such as about 10% or more, such as about 20% or more, such as about 30% or more, such as about 40% or more, such as about 50% or more, such as about 60% or more, such as about 70% or more, such as about 80% or more, such as about 90% or more, such as about 100% or less, such as about 90% or less, such as about 80% or less, such as about 70% or less, such as about 60% or less, such as about 50% or less, such as about 40% or less, such as about 30% or less, such as about 20% or less, such as about 10% or less, of the surface of the synthetic porous material.

Generally, the reaction agent may comprise a divalent metal cation, a trivalent metal cation, or a combination thereof. For instance, when the reaction agent comprises a divalent metal cation, the reaction agent may comprise calcium, cobalt, copper, iron, magnesium, manganese, nickel, strontium, cadmium, zinc, or a combination thereof. Further for instance, when the reaction agent comprises a trivalent metal cation, the reaction agent may comprise aluminum, cerium, chromium, gallium, gold, indium, iron, scandium, silver, yttrium, or a combination thereof. It should be understood that the disclosed divalent metal cations and trivalent metal cations are non-limiting. In this respect, any divalent metal cation or trivalent metal cation may be suitable for use as a reaction agent.

In general, the reaction agent may react with a solution (i.e., reaction solution) that contacts the synthetic porous material to form a chemical compound that is affixed to at least a portion of the synthetic porous material. In one aspect, the reaction solution may contact the synthetic porous material in a reaction vessel. The reaction solution may remain in contact with the synthetic porous material in the reaction vessel for a selectively chosen period of time. For instance, the synthetic porous material and the reaction solution may remain in contact for a period of time of from about 2 hours to about 30 days, such as about 2 hours or more, such as about 6 hours or more, such as about 12 hours or more, such as about 1 day or more, such as about 7 days or more, such as about 14 days or more, such as about 21 days or more, such as about 28 days or more, such as about 30 days or less, such as about 28 days or less, such as about 21 days or less, such as about 14 days or less, such as about 7 days or less, such as about 1 day or less, such as about 12 hours or less, such as about 6 hours or less. After such period of time has passed, the functionalized porous material may be removed from the reaction solution. Then, the functionalized porous material may be rinsed with water, such as deionized water, before being utilized for its intended purpose (e.g., filtration).

In general, the internal temperature of the reaction vessel may be from about 20° C. to about 200° C. while the reaction solution is in contact with the synthetic porous material. For instance, the internal temperature of the reaction vessel may be about 20° C. or more, such as about 40° C. or more, such as about 60° C. or more, such as about 80° C. or more, such as about 100° C. or more, such as about 120° C. or more, such as about 140° C. or more, such as about 160° C. or more, such as about 180° C. or more, such as about 200° C. or less, such as about 180° C. or less, such as about 160° C. or less, such as about 140° C. or less, such as about 120° C. or less, such as about 100° C. or less, such as about 80° C. or less, such as about 60° C. or less, such as about 40° C. or less. In this respect, in one aspect, the formation of functional groups on the synthetic porous material may occur at a temperature from about 20° C. to about 200° C., including all increments therebetween.

In one aspect the reaction solution may comprise a salt solution, a base composition, or a combination thereof. For instance, the reaction solution may be formed or prepared by preparing a salt solution and preparing a base composition and then mixing the salt solution and the base composition to form the reaction solution. Generally, the salt solution may comprise a salt and water, such as deionized water. In some aspects, the salt solution may comprise one or more salts. In one aspect, the salt of the salt solution may comprise a monovalent metal cation, a divalent metal cation, a trivalent metal cation, or a combination thereof, such as the divalent metal cations and trivalent metal cations previously disclosed herein. For instance, when a salt of the salt solution comprises a divalent metal cation, the salt may comprise calcium, cobalt, copper, iron, magnesium, manganese, nickel, strontium, cadmium, or zinc. Further for instance, when a salt of the salt solution comprises a trivalent metal cation, the salt may comprise aluminum, cerium, chromium, gallium, gold, indium, iron, scandium, silver, or yttrium. Additionally, for instance, when a salt of the salt solution comprises a monovalent metal cation, the salt may comprise lithium, potassium, sodium, or cesium.

In one aspect, the salt solution may be formed from mixing two or more salt solutions. For instance, the salt solution may be formed from mixing a monovalent metal cation salt solution, a divalent metal cation salt solution, and/or a trivalent metal cation salt solution. As used herein, a divalent metal cation salt solution refers to a salt solution where the majority of cations in the salt solution are divalent metal cations. As used herein, a trivalent metal cation salt solution refers to a salt solution where the majority of cations in the salt solution are trivalent metal cations. As used herein, a monovalent metal cation salt solution refers to a salt solution where the majority of cations in the salt solution are monovalent metal cations. In some aspects, the monovalent metal cation solution, the divalent metal cation salt solution, and/or the trivalent metal cation solution may contain cations of only one valency. For instance, the monovalent metal cation solution may not contain any divalent metal cations or trivalent metal cations. Further, for instance, the divalent metal cation solution may not contain any monovalent metal cations or trivalent metal cations. Additionally, for instance, the trivalent metal cation solution may not contain any monovalent metal cations or divalent metal cations.

In one aspect, the salt of the salt solution may be a metal chloride salt (e.g., sodium chloride, lithium chloride, potassium chloride, cesium chloride, calcium chloride, magnesium chloride, barium chloride, strontium chloride), sodium bisulfate, copper sulfate, magnesium sulfate, potassium iodide, or a combination thereof. The concentration of the salt in the salt solution may be from about 0.01 M to about 5 M, such as about 0.01 M or more, such as about 0.05 M or more, such as about 0.1 M or more, such as about 0.5 M or more, such as about 1 M or more, such as about 1.5 M or more, such as about 2 M or more, such as about 2.5 M or more, such as about 3 M or more, such as about 3.5 M or more, such as about 4 M or more, such as about 4.5 M or more, such as about 5 M or less, such as about 4.5 M or less, such as about 4 M or less, such as about 3.5 M or less, such as about 3 M or less, such as about 2.5 M or less, such as about 2 M or less, such as about 1.5 M or less, such as about 1 M or less, such as about 0.05 M or less.

Generally, the base composition may include alkali hydroxides, alkaline hydroxides, transition metal hydroxides, organic hydroxides, or a combination thereof. In this respect, the base composition may comprise a hydroxide. In some aspects, the base composition may be added and mixed with one or more salt solutions. The combination of the base composition and the salt solution may form a reaction solution with a pH of 7 or more, such as 8 or more, such as 9 or more, such as 10 or more, such as 11 or more, such as 12 or more, such as 13 or less, such as 12 or less, such as 11 or less, such as 10 or less, such as 9 or less, such as 8 or less. Notably, in some aspects, the pH of the reaction solution may be maintained by adding the base composition continuously or intermittently to the salt solution such that the resulting reaction solution has a maintained pH.

In one aspect, the base composition may be added to the salt solution such that the resulting reaction solution reaches thermodynamic saturation with respect to the cation (e.g., divalent metal cation, trivalent metal cation) of the base composition. For instance, calcium hydroxide, the base composition, may be added to a sodium chloride solution, the salt solution, such that the resulting reaction solution reaches thermodynamic saturation with respect to the soluble calcium of the calcium hydroxide.

Generally, the reaction solution of the present disclosure may have a selectively chosen saturation level. As used herein, the saturation level is determined by the following equation:

$$SL = C_i/C_{max}$$

where,

SL is the saturation level;

$C_i$ is the concentration of the species of interest (e.g., calcium) in the reaction solution; and $C_{max}$ is the concentration of the species of interest that can be present in the reaction solution before precipitation (e.g., mineral precipitation) becomes thermodynamically favorable.

In general, the value of $C_{max}$ may increase as the amount of salt in the salt solution is increased. In this respect, an increase in the concentration of salt in the salt solution may increase the $C_{max}$ of a reaction solution formed from a salt solution and a base composition.

In some aspects, to achieve the selectively chosen $C_i$(i.e., the concentration of the species of interest), an alkali hydroxide and/or an alkaline hydroxide containing the species of interest may be added to the reaction solution. In general, the base composition comprises the species of interest, which may be a divalent metal cation or a trivalent metal cation, including any of the divalent metal cations and trivalent metal cations previously disclosed herein. For instance, if the species of interest is calcium, the addition of calcium hydroxide may be used to achieve a selectively chosen $C_i$. Additionally or alternatively, the $C_i$ of the reaction solution may be achieved by the addition of an alkali oxide, an alkaline oxide, a salt (e.g., metal chloride salt), or a combination thereof. In this respect, for instance, if the species of interest is calcium, the $C_i$ of the reaction solution may be achieved by the addition of calcium oxide, calcium chloride, or a combination thereof.

In one aspect, the saturation level ("SL") of the reaction solution may be from about 0.01 to about 1, such as about 0.01 or more, such as about 0.05 or more, such as about 0.1 or more, such as about 0.2 or more, such as about 0.3 or more, such as about 0.4 or more, such as about 0.5 or more, such as about 0.6 or more, such as about 0.7 or more, such as about 0.8 or more, such as about 0.9 or more, such as about 1 or less, such as about 0.9 or less, such as about 0.8 or less, such as about 0.7 or less, such as about 0.6 or less, such as about 0.5 or less, such as about 0.4 or less, such as about 0.3 or less, such as about 0.2 or less, such as about 0.1 or less, such as about 0.05 or less.

In one aspect, the reaction solution may have a dwell time of from about 30 minutes to about 24 hours, such as about 30 minutes or more, such as about 1 hour or more, such as about 2 hours or more, such as about 3 hours or more, such as about 4 hours or more, such as about 5 hours or more, such as about 6 hours or more, such as about 8 hours or more, such as about 10 hours or more, such as about 12 hours or more, such as about 14 hours or more, such as about 16 hours or more, such as about 18 hours or more, such as about 20 hours or more, such as about 22 hours or more, such as about 24 hours or less, such as about 22 hours or less, such as about 20 hours or less, such as about 18 hours or less, such as about 16 hours or less, such as about 14 hours or less, such as about 12 hours or less, such as about 10 hours or less, such as about 8 hours or less, such as about 6 hours or less, such as about 5 hours or less, such as about 4 hours or less, such as about 3 hours or less, such as about 2 hours or less, such as about 1 hour or less. In this respect, in one aspect, the mixture of a salt solution and a base composition may be allowed to sit for a selectively chosen dwell time. After the allotted dwell time, the mixture may be decanted from any remnant or precipitated solids that may have formed. Then, the mixture may be added to a reaction vessel such that the mixture (i.e., reaction solution) contacts the synthetic porous material. Alternatively, in one aspect, the synthetic porous material may be placed or positioned in a reaction vessel that already contains the reaction solution.

In one aspect, the reaction solution may be recycled or reused after one or more functional groups of the synthetic porous material are formed. For instance, after the dwell time has passed, the functionalized porous material may be removed from the reaction solution and another, different synthetic porous material may be added to the reaction solution. Such a process may be repeated until the reaction solution is no longer capable of aiding in the formation of functional groups on a synthetic porous material.

As previously disclosed herein, in one aspect, the functionalized porous material may comprise chemical compounds such as a mineral, a synthetic mineral, a sol, a gel, a clayey material, or a combination thereof. For instance, when the chemical compound is a synthetic mineral, the functionalized porous material may comprise a mixed-metal hydroxide (e.g., layered double hydroxide), a single-metal hydroxide (e.g., brucite), or a combination thereof. In this respect, the functionalized porous material may include a layered double hydroxide such as, for instance, Friedel's salt, cualstibite, fougerite, glaucocerinite, hydrocalumite, hydrotalcite, quintinite, wermlandite, woodwardite, or a combination thereof. In general, the layered double hydroxide may comprise two or more metal cations. For instance, the layered double hydroxide may comprise any of the divalent metal cations and/or trivalent metal cations previously disclosed herein. In one aspect, the layered double hydroxide may comprise at least one divalent metal cation and at least one trivalent metal cation.

Generally, a layered double hydroxide may have a layer arrangement of [ABC D ABC], where “A” is a layer of hydroxide anions, “B” is a layer of metal cations, “C” is another layer of hydroxide anions, and “D” is an intercalated layer of anions and water. The metal cations of layer B may comprise any of the divalent metal cations and/or trivalent metal cations previously disclosed herein. The intercalated layer D may comprise halides, non-metal oxoanions, oxometallate anions, anionic complexes of transition metals, volatile organic anions, anionic polymers, water, or a combination thereof. For instance, the intercalated layer D may comprise bromide, carbonate, chloride, nitrate, sulfate, water, or a combination thereof. As used herein, an anion of intercalated layer D may be referred to as an intercalated anion.

In general, a layered double hydroxide may have the general chemical formula:

$$[M_{1-x}^{2+}M_x^{3+}(OH)_2]^{x+}[D^{n-}]_{x/n}\bullet mH_2O$$

where,

M is a metal, one M being a divalent metal cation and the other, different M being a trivalent metal cation;

x is the mole fraction;

D is the intercalated anion;

n is the charge of the intercalated anion; and m is the number of water molecules.

As observed in the previously disclosed chemical formula, a layered double hydroxide generally comprises a divalent metal cation and a trivalent metal cation. In general, the mole fraction, x, may vary. In one aspect, the mole fraction, x, may be from about 0.25 to about 0.33. In this respect, in one aspect, the ratio of the divalent metal cation to the trivalent metal cation may be 3:1 (i.e., the value of x is 0.25). Further, in another aspect, the ratio of the divalent metal cation to the trivalent metal cation may be 2:1 (i.e., the value of x is 0.33). Generally, the layered double hydroxide may comprise a divalent metal cation and a trivalent metal cation in a ratio from about 1:6 to about 6:1, including all ratios therebetween, such as about 1:6, such as about 1:3, such as about 1:2, such as about 2:3, such as about 5:6, such as about 1:1, such as about 6:5, such as about 3:2, such as about 2:1, such as about 3:1, such as about 6:1.

As previously disclosed, the layered double hydroxide may include Freidel’s salt. Freidel’s salt has the general chemical formula:

$$Ca_2Al(OH)_6Cl\bullet 2H_2O$$

In this respect, for Freidel’s salt, the ratio of the divalent metal cation (i.e., calcium) to the trivalent metal cation (i.e., trivalent metal cation) to the intercalated anion (i.e., chloride) may be 2:1:1.

In one aspect, the reaction solution may functionalize the synthetic porous material to form a functionalized porous material with a selectively chosen number of functional groups. For instance, in one aspect, the reaction solution may functionalize the synthetic porous material to form a functionalized porous material that has different functional groups, such as two different functional groups or such as three different functional groups. In one aspect, the reaction solution and the reaction agent may functionalize the synthetic porous material to form a functionalized porous material. In this respect, as previously disclosed, the reaction of the reaction solution and the reaction agent may result in the growth or formation of a chemical compound on a synthetic porous material. In one aspect, the chemical compound formed from the reaction of the reaction solution and the reaction agent is a synthetic mineral (e.g., mixed-metal hydroxide), which would be considered the functional group of the functionalized porous material in this aspect. Notably, after the formation of the synthetic mineral on the synthetic porous material, the synthetic porous material may be referred to as a functionalized porous material (e.g., functionalized engineered cellular magmatic).

In one aspect, the presence of a layered double hydroxide on the functionalized porous material may be determined by scanning electron microscopy with energy dispersive X-ray spectroscopy (“SEM/EDX”). For instance, as illustrated in FIG. 1, Freidel’s salt 102 is observed at an analytical area of about 0.16 square millimeters. As observed in FIG. 1, Friedel’s salt 102 is in the form of hexagonal platelets that are growing on the surface of an engineered cellular magmatic and are affixed to the surface of the engineered cellular magmatic. As previously disclosed, a synthetic porous material may be referred to as a functionalized porous material after the formation of a synthetic mineral on the surface of the synthetic porous material. As such, FIG. 1 illustrates a functionalized porous material 100 in accordance with the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

The invention claimed is:

1. A method of forming a functionalized porous material, the method comprising:

positioning a synthetic porous material within a reaction vessel, the synthetic porous material comprising an engineered cellular magmatic, the synthetic porous material comprising a surface, wherein at least a portion of the synthetic porous material surface is a substrate; and adding a reaction solution to the reaction vessel, wherein the reaction solution contacts the synthetic porous material, the reaction solution comprising a salt solution and a base composition, the salt solution comprising a salt and water, the salt solution having a concentration of from about 0.01 M to about 5 M of the salt, the base composition comprising a hydroxide, wherein the synthetic porous material is functionalized to form a functionalized porous material, wherein a functional group of the functionalized porous material is a mixed-metal hydroxide.

2. The method of claim 1, wherein the synthetic porous material comprises a reaction agent.

3. The method of claim 2, wherein the reaction agent comprises aluminum.

4. The method of claim 2, wherein the contact of the reaction solution to the synthetic porous material results in the dissolution of at least a portion of the reaction agent.

5. The method of claim 2, wherein the reaction agent and the reaction solution react to form the mixed-metal hydroxide in the step of adding the reaction solution to the reaction vessel, wherein the mixed-metal hydroxide is affixed to the substrate.

6. The method of claim 1, wherein the mixed-metal hydroxide comprises a layered double hydroxide.

7. The method of claim 1, wherein the reaction solution has a dwell time of about 1 hour to about 24 hours after mixing the base composition with the salt solution to form the reaction solution and before adding the reaction solution to the reaction vessel.

8. The method of claim 1, wherein the reaction solution and the synthetic porous material remain in contact for a period of about 1 hour to about 30 days after adding the reaction solution to the reaction vessel.

9. The method of claim 1, wherein the salt solution has a concentration of from about 0.01 M to about 5.0 M of the salt.

10. The method of claim 1, wherein the reaction solution has a saturation level of from about 0.01 to about 1.

11. The method of claim 2, wherein the reaction agent comprises a divalent metal cation, a trivalent metal cation, or a combination thereof.

12. The method of claim 2, wherein the reaction agent comprises a halide, a non-metal oxoanion, an oxometallate anion, an anionic complex of a transition metal, a volatile organic anion, an anionic polymer, water, or a combination thereof.

13. The method of claim 1, wherein the mixed-metal hydroxide comprises two or more metal cations, wherein the two or more metal cations comprise at least one divalent metal cation and at least one trivalent metal cation.

14. The method of claim 13, wherein the at least one divalent metal cation comprises calcium, cobalt, copper, iron, magnesium, manganese, nickel, strontium, cadmium, zinc, or a combination thereof, and wherein the at least one trivalent metal cation comprises aluminum, cerium, chromium, gallium, gold, indium, iron, scandium, silver, yttrium, or a combination thereof.

15. The method of claim 1, wherein the mixed-metal hydroxide comprises a layered double hydroxide and the synthetic porous material comprises a reaction agent.

16. The method of claim 15, wherein the reaction agent comprises aluminum.

17. The method of claim 1, wherein:

the synthetic porous material comprises a reaction agent, the mixed-metal hydroxide comprises two or more metal cations, the two or more metal cations comprising at least one divalent metal cation and at least one trivalent metal cation, the at least one divalent metal cation comprising calcium, cobalt, copper, iron, magnesium, manganese, nickel, strontium, cadmium, zinc, or a combination thereof, and the at least one trivalent metal cation comprising aluminum, cerium, chromium, gallium, gold, indium, iron, scandium, silver, yttrium, or a combination thereof; and the mixed-metal hydroxide comprises a layered double hydroxide.

* * * * *